(12) United States Patent
MacPherson et al.

(10) Patent No.: US 6,976,292 B2
(45) Date of Patent: Dec. 20, 2005

(54) RESILIENT CLIP FASTENER

(75) Inventors: Terrence B. MacPherson, Marysville, MI (US); Jeffrey A. Slobodecki, Wales, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/651,170

(22) Filed: Aug. 28, 2003

(65) Prior Publication Data

US 2005/0044672 A1    Mar. 3, 2005

(51) Int. Cl.[7] .............................. E04F 19/02; F16B 5/12
(52) U.S. Cl. .............................. 24/293; 24/292; 24/295
(58) Field of Search ..................... 24/293, 295, 289, 24/292; 411/173, 174, 175, 182

(56) References Cited

U.S. PATENT DOCUMENTS

| | | | |
|---|---|---|---|
| 1,873,871 A | 8/1932 | Carr | |
| 2,032,315 A | 2/1936 | Chaffee | |
| 2,086,288 A | 7/1937 | Van Uum | |
| 2,181,966 A | 12/1939 | Dean | |
| 2,426,799 A | 9/1947 | Tinnerman | |
| 2,509,192 A | 5/1950 | Poupitch | |
| 2,618,998 A | 11/1952 | Poupitch | |
| 2,885,754 A * | 5/1959 | Munse | 24/293 |
| 2,930,090 A * | 3/1960 | Brown et al. | 24/292 |
| 2,959,259 A | 11/1960 | Meyer | |
| 3,400,743 A | 9/1968 | Strange | |
| 3,486,202 A * | 12/1969 | Nelson | 24/292 |
| 3,795,890 A * | 3/1974 | Van Buren, Jr. | 24/326 |
| 3,864,789 A | 2/1975 | Leitner | |
| 3,939,752 A | 2/1976 | Koscik | |
| 4,300,865 A | 11/1981 | Murray | |
| 4,402,118 A | 9/1983 | Benedetti | |
| 4,595,325 A | 6/1986 | Moran et al. | |
| 4,606,688 A * | 8/1986 | Moran et al. | 411/175 |
| 4,610,588 A | 9/1986 | Van Buren, Jr. et al. | |
| 4,644,612 A | 2/1987 | Osterland | |
| 4,668,145 A | 5/1987 | Hirohata | |
| 4,865,505 A | 9/1989 | Okada | |
| 4,925,351 A | 5/1990 | Fisher | |
| 5,542,158 A | 8/1996 | Gronau et al. | |
| 5,636,891 A | 6/1997 | Van Order et al. | |
| 5,774,949 A | 7/1998 | Cornell et al. | |
| 5,857,735 A | 1/1999 | Alonso | |
| 5,919,019 A | 7/1999 | Fischer | |
| 5,991,976 A | 11/1999 | Adams et al. | |
| 5,992,914 A | 11/1999 | Gotoh et al. | |
| 6,095,734 A | 8/2000 | Postadan et al. | |
| 6,101,686 A | 8/2000 | Velthoven et al. | |
| 6,517,302 B2 | 2/2003 | Lee | |
| 2002/0100146 A1 | 8/2002 | Ko | |

FOREIGN PATENT DOCUMENTS

| | | |
|---|---|---|
| EP | 0 743 461 | 4/1996 |
| EP | 0 930 440 | 1/1999 |
| EP | 1 087 150 | 8/2000 |

* cited by examiner

*Primary Examiner*—Robert J. Sandy
(74) *Attorney, Agent, or Firm*—Harness, Dickey & Pierce, P.L.C.

(57) ABSTRACT

A resilient clip having an engagement tab, which terminates at a load distributing element, and wing members that are configured to co-engage a structure to which the resilient clip is to be coupled. The wing members terminate at an engagement edge and are configured to co-engage the structure at a location along a length of their engagement edge. The load distributing element being configured to contact the structure in response to application of a withdrawing force to the resilient clip so that the load distributing element increases an area over which the withdrawing force.

16 Claims, 3 Drawing Sheets

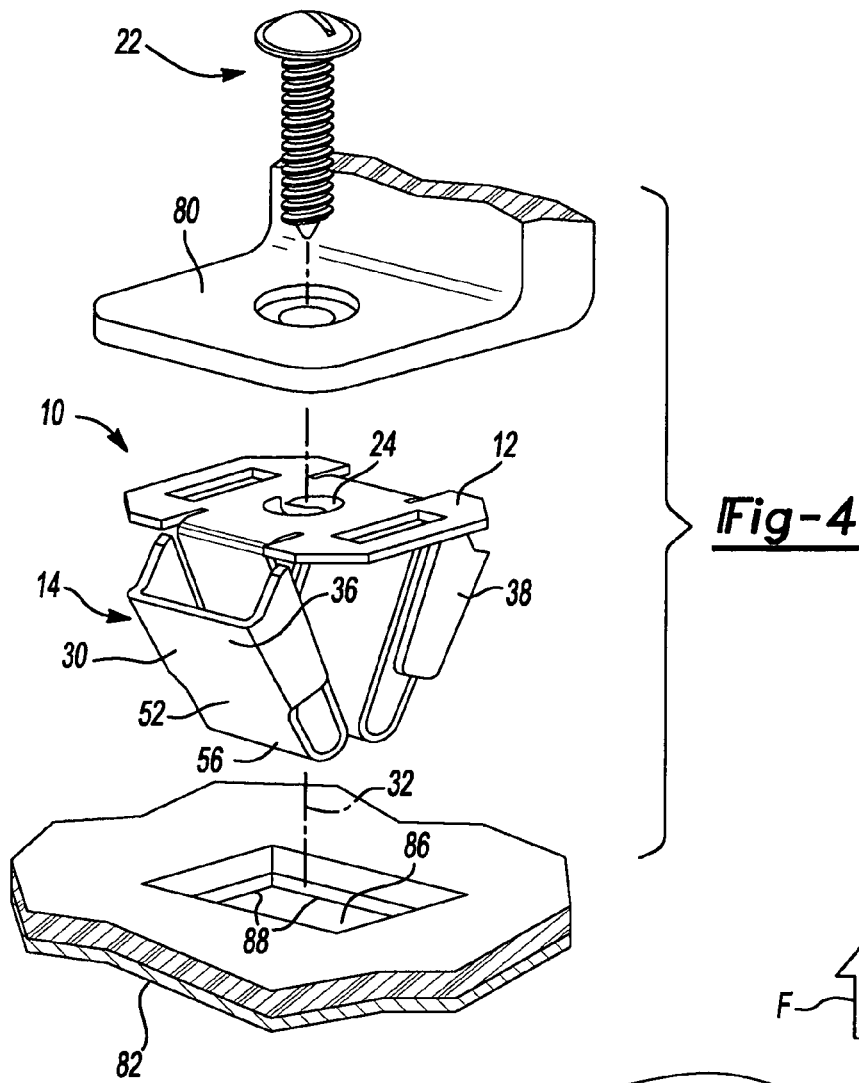
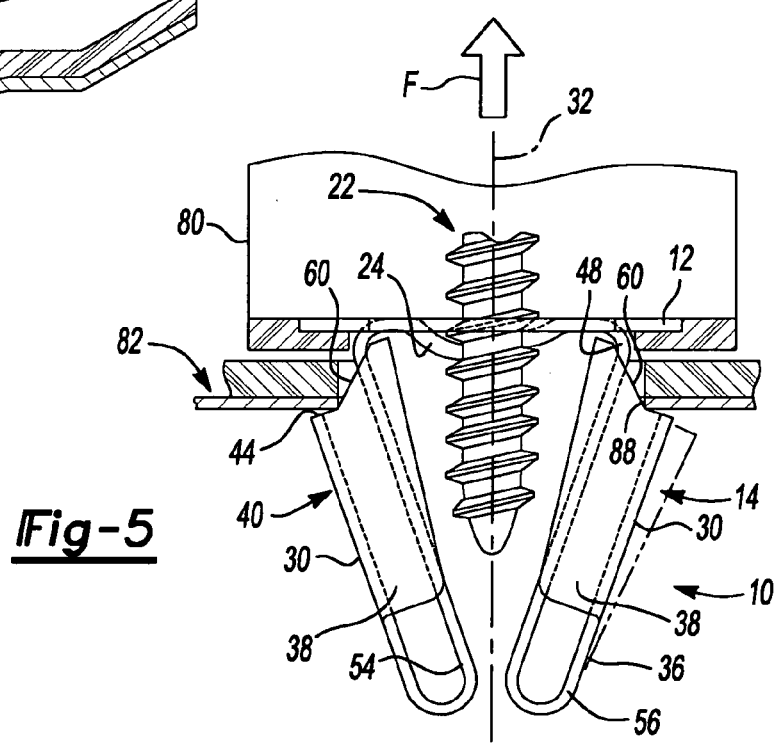

RESILIENT CLIP FASTENER

FIELD OF THE INVENTION

The present invention generally relates to resilient clip fasteners and more particularly to resilient clip fasteners that employ a plurality of wing members to secure the resilient clip fastener to a structure. More specifically, the present invention relates to a resilient clip fastener having a construction that utilizes wing members and engagement tabs to permit the fastener to be inserted with a relatively low insertion force while resisting relatively high withdrawal forces in a manner that distributes the withdrawal force over a relatively large area.

BACKGROUND OF THE INVENTION

Clip fasteners of the type that employ wing members to engage the edge of a hole in a structure are known in the art. Such clip fasteners have relatively small areas of engagement with the structure to which they are attached, which tends to reduce the force needed for the installation of the clip fastener to the structure. One drawback of this configuration is that a withdrawal force applied to the clip fastener is distributed over a correspondingly small area. Accordingly, there remains a need in the art for an improved clip fastener that may be installed with relatively low insertion forces but which resists relatively high withdrawal forces in a manner that distributes the withdrawal force over a relatively large area.

SUMMARY OF THE INVENTION

In one form, the present invention provides a clip for securing a first structure to a second structure. The clip includes a retaining portion with a pair of engagement structures that are disposed on opposite sides of an insertion axis. Each engagement structure includes an engagement tab and a pair of wing members. The engagement tab includes a free end, which is biased outwardly from the insertion axis, and a load distributing element that is associated with the free end. The wing members terminate at an engagement edge that extends in a direction toward the insertion axis and upwardly from the free end of their associated engagement tab. The wing members are configured to co-engage an edge of a hole formed in one of the first and second structures at a location along a length of their engagement edge to resist removal therefrom. The load distributing elements are configured to contact the one of the first and second structures in response to the application of a withdrawing force to the clip to thereby distribute the withdrawing force over an area substantially larger than an area over which the wing members contact the one of the first and second structures.

In another form, the present invention provides a resilient clip for use in securing a first structure to a second structure. The resilient clip includes a retaining portion having an engagement tab, which terminates at a load distributing element, and first and second wing members on opposite sides of the engagement tab. Each of the first and second wing members terminates at an engagement edge that is skewed to an axis along which the retaining portion is to be inserted through a hole in one of the first and second structures. The retaining portion is configured such that the engagement edges of the first and second wing members co-engage an edge of the hole at a location along a length of their engagement edge. The retaining portion is further configured so that the load distributing element contacts the one of the first and second structures in response to application of a withdrawing force to the resilient clip so as to increase an area over which the withdrawing force is applied relative to the engagement edges alone.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 4 is an exploded perspective view of the resilient clip of FIG. 1 in association with a first structure and a second structure;

FIG. 5 is a side elevation view in partial section illustrating the resilient clip of FIG. 1 as installed to the first and second structures with a withdrawing force applied thereto;

DETAILED DESCRIPTION OF THE PREFERRED EMBODIMENTS

Figure 1:
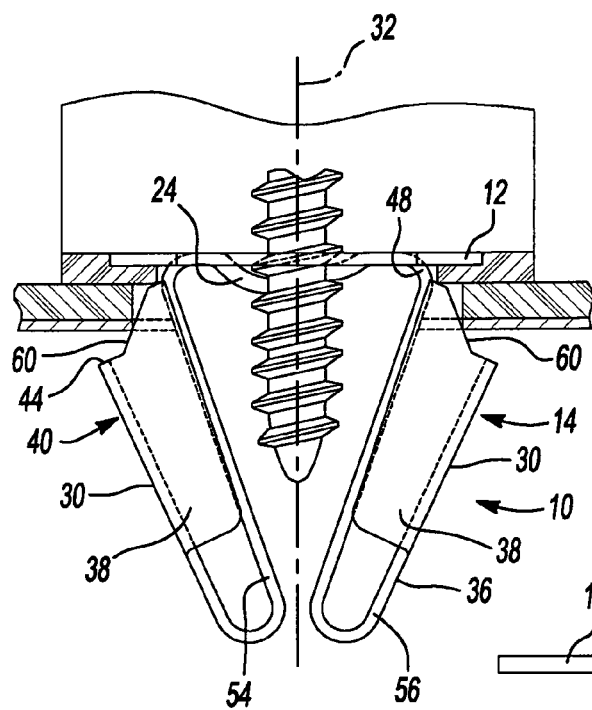
FIG. 1 is a side elevation view of a resilient clip constructed in accordance with the teachings of the present invention.
Figure 2:
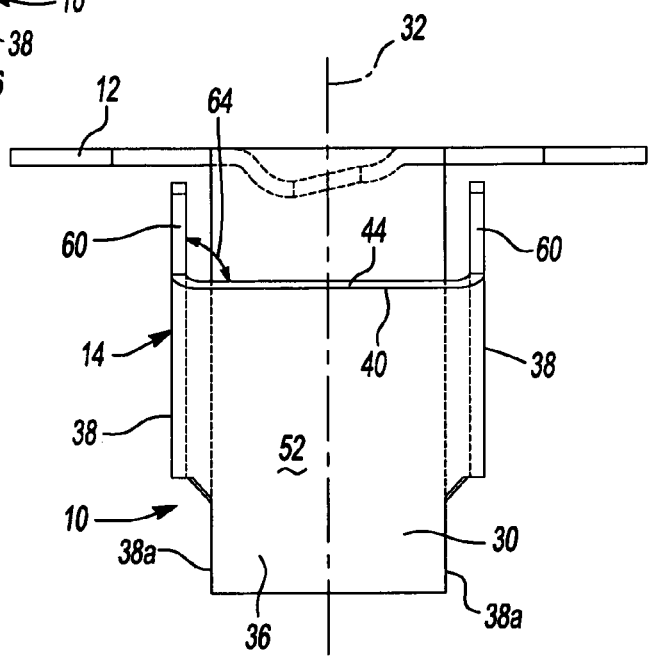
FIG. 2 is a front elevation view of the resilient clip of FIG. 1.
Figure 3:
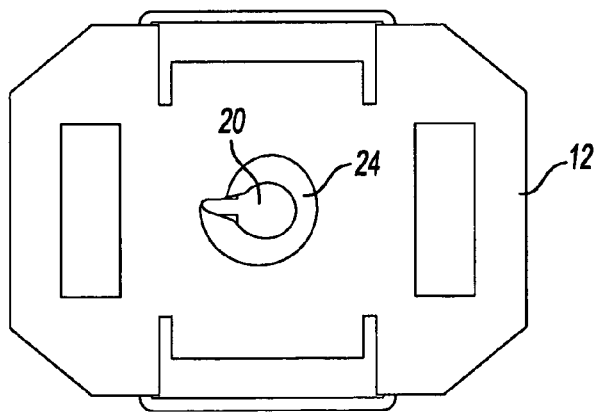
FIG. 3 is a top plan view of the resilient clip of FIG. 1.

With reference to FIGS. 1 through 3 of the drawings, a fastener or resilient clip constructed in accordance with the teachings of the present invention is generally indicated by reference numeral 10. In the particular example provided, the resilient clip 10 is unitarily formed from a sheet metal material and includes an installation flange 12 and a retaining portion 14.

The installation flange 12 is generally planar and includes an aperture 20 for receiving therethrough a conventional threaded fastener 22 (FIGS. 4 and 5). In the particular embodiment illustrated, the aperture 20 is generally keyhole shaped, with a helical lip 24 for engaging the threads of the threaded fastener 22.

The retaining portion 14 includes a pair of engagement structures 30 that are located on opposite sides of an insertion axis 32 along which the resilient clip 10 is to be installed. Each engagement structure 30 includes an engagement tab 36 and a plurality of wing members 38.

The engagement tab 36 includes a free end 40, which is biased outwardly from the insertion axis 32, and a load distributing element 44 that is associated with the free end 40. In the example provided, the engagement tabs 36 are generally U-shaped, having a fixed end 48 opposite the free end 40 that is fixedly coupled to the installation flange 12 and a generally flat outer surface 52 while the load distributing element 44 is integrally formed with the free end 40 of the engagement tab 36, being an edge of the sheet metal material from which the resilient clip 10 is formed. The configuration of the engagement tab 36 in the example provided is such that it includes an inner leg 54 and an outer leg 56, wherein the inner leg 54 is skewed to the installation axis 32 so that a proximal end of the inner leg 54 (i.e., the fixed end 48 of the engagement tab 36) is relatively further away from the insertion axis 32 than the distal end of the inner leg 54. The outer leg 56 is coupled to the distal end of the inner leg 54, extending upwardly and away therefrom.

Each wing member 38 terminates at an engagement edge 60 that extends from the engagement structure 30 in a direction that extends toward the insertion axis 32 and upwardly from the free end 40 of an associated engagement tab 36. Accordingly, the engagement edges 60 are skewed to the insertion axis 32. In the embodiment illustrated, the engagement edges 60 are flat and the wing members 38 are coupled to the opposite lateral sides 38a of their associated engagement tab 36 with an included angle 64 therebetween of about 90 degrees.

The installation of the resilient clip 10 is generally illustrated in FIGS. 4 and 5. The threaded fastener 24 is initially employed to install the resilient clip 10 to a first structure 80, such as a grab handle for an automotive vehicle. Briefly, the threaded fastener 22 is inserted through the first structure 80 and threadably engaged to the helical lip 24. It should be noted that despite the depiction of the threaded fastener 22 extending substantially through the resilient clip 10, the threaded fastener 22 does not touch the retaining portion 14 (i.e., the threaded fastener 22 does not contact either of the engagement structures 30). Thereafter, the assembly (i.e., the resilient clip 10, the threaded fastener 22 and the first structure 80) is positioned relative to a second structure 82, such as a vehicle body, so that the retaining portion 14 of the resilient clip 10 may be inserted into an aperture 86 in the second structure 82. Contact between the outer surface 52 of the outer legs 56 of the engagement tabs 36 and the edges 88 of the aperture 86 in the second structure 82 pushes the engagement tabs 36 and the wing members 38 inwardly toward to the installation axis 32. When the retaining portion 14 of the resilient clip 10 has been sufficiently inserted, the wing members 38 spring outwardly (due to the resilient engagement tabs 36 in the example provided) such that the engagement edge 60 of each wing member 38 engages an edge 88 of the aperture 86 in the second structure 82. In this way, the wing members 38 associated with each of the engagement tabs 36 co-engage the second structure 82.

When a withdrawing force is applied to the resilient clip 10 (i.e., a force in a direction that tends to withdraw the resilient clip 10 from the second structure 82 so that the load distributing elements 44 contact the second structure 82), the retaining portion 14 withdraws slightly from the second structure 82 so that both the engagement edges 60 and the load distributing elements 44 are in contact with the second structure 82. The additional surface area of the load distributing elements 44 greatly increases the total surface area over which the withdrawing force is transmitted to the second structure 82. Since deformation of the second structure 82 is a function of both the magnitude of the withdrawing force and the area over which the withdrawing force is applied (to the second structure 82), the substantial increase in the load-transmitting area provided by the load distributing elements 44 substantially reduces the likelihood that the second structure 82 will be deformed as a result of the application of the withdrawing force to the resilient clip 10.

Figure 6:
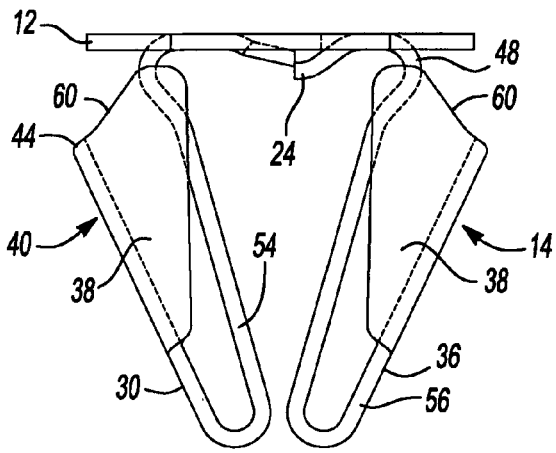
FIG. 6 is a side elevation view of a second resilient clip constructed in accordance with the teachings of the present invention.

While the resilient clip has been illustrated and described thus far in the context of a particular embodiment, those skilled in the art will appreciate that the invention, in its broader aspects, may be constructed somewhat differently. For example, a fillet radius may be employed at the intersection of each engagement edge 60 and load distributing element 44 as illustrated in FIG. 6. A radius may also be employed to eliminate the sharp corners at the top of each of the wing members 38.

Figure 7:
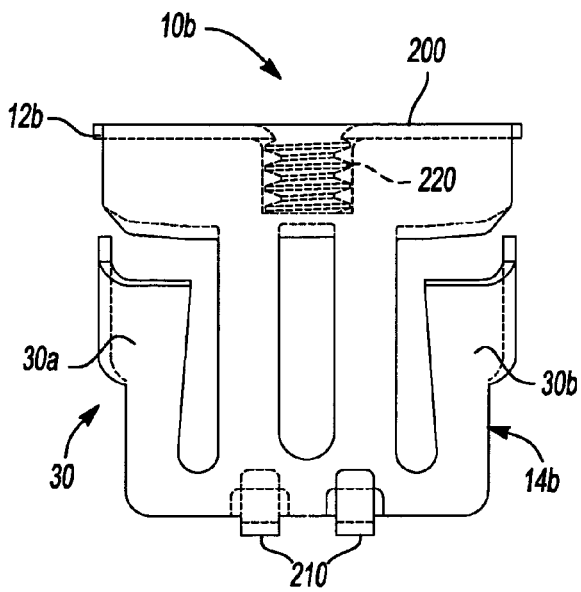
FIG. 7 is a front elevation view of a third resilient clip constructed in accordance with the teachings of the present invention.
Figure 8:
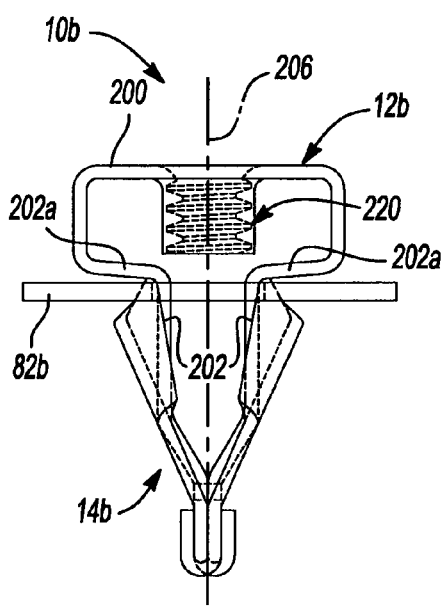
FIG. 8 is a side elevation view of the resilient clip of FIG. 7 as installed to a workpiece.
Figure 9:
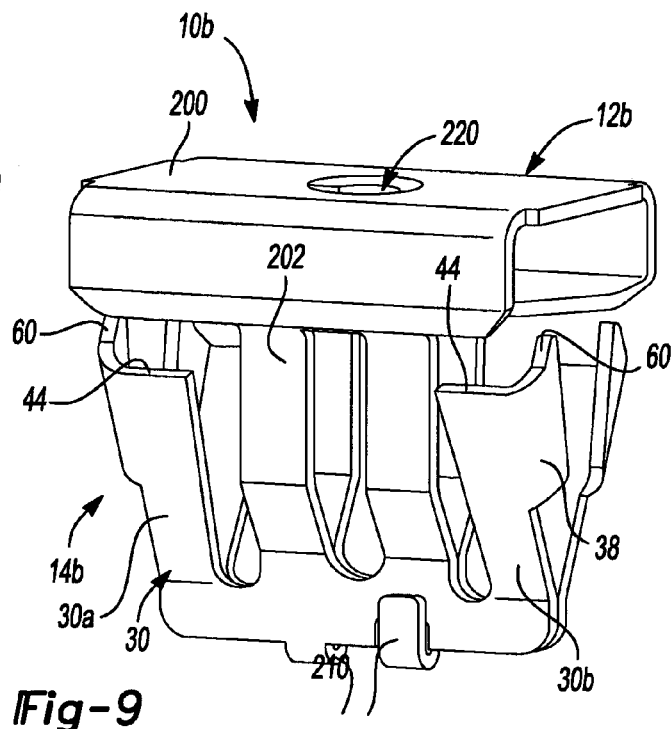
FIG. 9 is a perspective view of the resilient clip of FIG. 7.

The example of FIGS. 7 through 9 illustrates yet another resilient clip 10b constructed in accordance with the teachings of the present invention. The resilient clip 10b is illustrated to include an installation flange 12b and a retaining portion 14b.

The installation flange 12b includes a generally U-shaped body portion 200 and a pair of L-shaped legs 202 that are coupled to the opposite ends of the body portion 200 and depend downwardly therefrom. As best shown in FIG. 8, the base 202a of each leg 202 is configured to contact a work piece structure 82b when the resilient clip 10b is inserted thereto to prevent the resilient clip 10b from being pushed through the work piece structure 82b. The distal end of each leg 202 tapers inwardly toward the lateral centerline 206 of the installation flange 12b. In the particular example provided, hooks 210, which are integrally formed with each leg 202, are employed to fixedly secure the legs 202 to one another in a manner that is well known in the art. Briefly, the hook 210 of one leg 202 cradles the distal end of the other leg 202 and the hook 210 is crimped to fix the other leg 202 to the hook 210.

The installation flange 12b may also include an aperture (not shown) for receiving a fastener (not shown) therethrough or may include a threaded element 220 that is configured to threadably engage a fastener (not shown). In the example provided, the threaded element 220 is integrally formed with the body portion 200 and more specifically, is extruded, for example in a progressive die, and threaded. Those skilled in the art will appreciate from this disclosure that other techniques may be employed to associate a threadform with the body portion 200, such as a cage nut, a weld nut or a helical lip of the type that is illustrated in connection with the resilient clip of FIG. 1.

The retaining portion 14b is similar to the retaining portion 14 of FIG. 1, except that each engagement structure 30 includes first and second structure portions 30a and 30b, respectively, that are disposed on opposite sides of an associated leg 202. Due to the similarities between the retaining portion 14b and the retaining portion 14 (which is discussed in significant detail, above), further discussion of the retaining portion 14b is unnecessary.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A resilient clip for use in securing a first structure to a second structure, the resilient clip comprising:

a retaining portion having an engagement tab with first and second wing members on opposite sides thereof, the engagement tab terminating at a load distributing element, each of the first and second wing members terminating at an engagement edge that is skewed to an axis along which the retaining portion is to be inserted through a hole in one of the first and second structures, the retaining portion being configured such that the engagement edges of the first and second wing members co-engage an edge of the hole at a location along a length of their engagement edge, the retaining portion being further configured so that the load distributing element contacts the one of the first and second structures in response to application of a withdrawing force to the resilient clip, the load distributing element thereby increasing an area over which the withdrawing force is applied relative to the engagement edges alone.

2. The resilient clip of claim 1, wherein each of the first and second wing members is positioned at an angle of about 90 degrees relative to the engagement tab.

3. The resilient clip of claim 2, wherein an outer surface of the engagement tab is generally flat.

4. The resilient clip of claim 1, further comprising an installation flange coupled to the retaining portion.

5. The resilient clip of claim 4, wherein the engagement tab is generally U-shaped, with a first end thereof being coupled to the installation flange and a second end thereof forming the load distributing element.

6. The resilient clip of claim 1, wherein the load distributing element is an edge of a sheet metal material that forms the engagement tab.

7. A clip for securing a first structure to a second structure, the clip comprising:

a retaining portion with a pair of engagement structures that are disposed on opposite sides of an insertion axis, each of the engagement structures including at least one engagement tab and a pair of wing members, the at least one engagement tab including a free end, the at least one engagement tab being configured such that their free end diverges upwardly and outwardly from the insertion axis, the at least one engagement tab also including a load distributing element that is connected to the free end, each wing member converging upwardly and inwardly toward the insertion axis and terminating at an engagement edge that is not coincident with an associated load distributing element, the wing members being configured to co-engage an edge of a hole formed in one of the first and second structures at a location along a length of their engagement edge to resist removal therefrom, the load distributing elements being configured to additionally contact the one of the first and second structures in response to application of a withdrawing force to the clip to thereby distribute the withdrawing force over an area substantially larger than an area over which the wing members contact the one of the first and second structures.

8. The clip of claim 7, wherein each pair of wing members is coupled to a single engagement tab.

9. The clip of claim 7, wherein an interior angle between each wing member and the free end of its associated engagement tab is about 90 degrees.

10. The clip of claim 7, wherein the engagement edges are flat.

11. The clip of claim 7, wherein a fillet radius interconnects each engagement edge to the load distributing element.

12. The clip of claim 7, wherein each engagement edge intersects the load distributing element at an oblique angle.

13. A resilient clip for use in securing a first structure to a second structure, the resilient clip comprising:

a retaining portion having a pair of engagement tabs and a wing member coupled to each of the engagement tabs, each engagement tab terminating at a load distributing element, each wing member terminating at an engagement edge that is skewed to an axis along which the retaining portion is to be inserted through a hole in one of the first and second structures, the retaining portion being configured such that the engagement edges of the wing members co-engage an edge of the hole at a location along a length of their engagement edge, the retaining portion being further configured so that the load distributing elements contact the one of the first and second structures in response to application of a withdrawing force to the resilient clip, the load distributing elements thereby increasing an area over which the withdrawing force is applied relative to the engagement edges alone.

14. The clip of claim 13, wherein the engagement edges are flat.

15. The clip of claim 13, wherein a fillet radius interconnects each engagement edge to the load distributing element.

16. The clip of claim 13, wherein each engagement edge intersects the load distributing element at an oblique angle.

* * * * *

UNITED STATES PATENT AND TRADEMARK OFFICE
CERTIFICATE OF CORRECTION

PATENT NO. : 6,976,292 B2 Page 1 of 1
APPLICATION NO. : 10/651170
DATED : December 20, 2005
INVENTOR(S) : Terrence B. MacPherson et al.

It is certified that error appears in the above-identified patent and that said Letters Patent is hereby corrected as shown below:

<u>Title page,</u>
Item [57], ABSTRACT,
Line 7, "being" should be -- is --.
Line 10 "an" should be -- the --; and after "force" insert -- is applied relative to the engagement edges alone --.

Signed and Sealed this

Twentieth Day of June, 2006

JON W. DUDAS
*Director of the United States Patent and Trademark Office*